United States Patent Office 3,088,920
Patented May 7, 1963

3,088,920
PROCESS FOR TREATING TETRAALKYLLEAD COMPOSITIONS
Frederick M. Palfrey, Carney's Point, and Richard Wolfe, Wenonah, N.J., assignors to E. I. du Pont de Nemours and Company, Wilmington, Del., a corporation of Delaware
No Drawing. Filed Apr. 26, 1960, Ser. No. 24,657
7 Claims. (Cl. 252—386)

This invention relates to a process for treating tetraalkyllead antiknock compositions and particularly for removing sludge and haze-forming impurities from such compositions.

Tetraethyllead is a well known antiknock agent for motor fuels. Also, it has been proposed to employ other tetraalkyllead compositions, such as tetramethyllead, mixed tetraalkyllead compounds containing 1 to 3 methyl groups and 3 to 1 ethyl groups, and mixtures of such tetraalkyllead compounds, as antiknock agents. The purified tetraalkyllead antiknock compounds are blended with other agents, according to specifications relating to their use, to produce antiknock blends for automotive and aviation fuels. Such antiknock blends are comprised generally of 1 or more tetraalkyllead compounds, halohydrocarbon scavenging agents for lead in the combustion processes, identifying dyes, and inert solvent oils.

Ordinarily, the tetraalkyllead antiknock compounds are manufactured by alkylating a lead sodium alloy with an alkyl chloride, such as ethyl chloride, methyl chloride, or a mixture of methyl chloride and ethyl chloride. The tetraalkyllead produced in the alkylation reaction usually is separated from the reaction mass by steam distillation. The steam-distilled product is impure, containing a small proportion of finely divided suspended materials, e.g. metallic lead, and objectionable sludge-forming impurities, such as organo derivatives of bismuth (which metal is generally present in the lead used in such process), alkyl lead chlorides and oxides, and a variety of other metallic impurities in trace quantities inherently present in the lead. Such impurities seldom exceed 2 parts by weight per 1,000 parts of tetraalkyllead.

Various methods may be employed to remove the impurities and produce a product having acceptable purity. Suspended matter and the particularly objectionable organobismuth impurities may in large part be removed and destroyed by a variety of methods, as described in U.S. Patents 2,400,383; 2,407,261; 2,407,262; 2,407,263; 2,407,307; 2,426,789; 2,432,321; 2,440,810. For example, the steam-distilled product may be blown with air in the presence of water or in the presence of water containing a sludge deactivating agent and then separated by decantation from the aqueous phase and the sludge-like products formed in the aeration process.

The thus purified product normally contains very small but troublesome quantities of particulate and gelatinous inorganic material, as a fine suspension or smokey haze. This material is composed largely of lead, lead oxide, lead salts, iron oxide from the equipment, and bismuth oxide, and in addition invariably contains inorganic compounds of a variety of other metals inherently present in trace quantities in the purchased lead for the alkylation process. The suspended hazy matter is difficult to remove by filtration, unless costly special facilities are employed. It tends to pass through ordinary filter media and to clog fine filters, resulting in inefficient or very slow filtration. Carried over to the blending operation, it results in hazy (cloudy) blends.

Further, it has been found that hazy (cloudy) blends are produced even if filtered, haze-free tetraalkyllead antiknock compounds are used for their preparation. This new cloudiness or haze may be attributed in part to impurities in the other blending ingredients, such as the small quantities of benzene insolubles that may be present in the dyes used to mark the blends, and in part to the interaction of the tetraethyllead product with the scavengers. For example, mixing clear tetraethyllead and ethylene dibromide results in the immediate appearance of a haze, analysis of which shows that it contains lead and bromine and consists at least in part of triethyllead bromide.

In the industry, cloudiness in the blends is associated with instability and poor quality and it is therefore desirable to provide haze-free blended products. Efficient filtration of the tetraalkyllead compound and/or its blends, simple as it may appear, is not practical because of the technical difficulties and relatively high cost involved in such operation as indicated above.

However purified, the tetraalkyllead antiknock compounds and the antiknock blends made therefrom are not inert. Though made clear, they are prone to deteriorate and in time become hazy and deposit sludge, especially under the conditions normally employed for their handling, shipping and storing. The blends are stored, transported and handled in drums, shipping and storage tanks, and in other auxiliary equipment, which normally are of ferrous metal construction and subject to corrosion. Invariably, small but troublesome quantities of water and air are present along with the antiknock composition. Under such conditions, in contact with metallic surfaces and in the presence of even relatively minute quantities of water and oxygen, the tetraalkyllead antiknock compositions are prone to deteriorate, with the formation of haze and sludge. This occurs even though the tetraalkyllead composition had been treated to free it of sludge-forming impurities. The products of this new decomposition contain iron from the equipment, lead from organo lead, and halogen from halohydrocarbon scavenger. Such deterioration constitutes an important economic and technical problem. It is self-perpetuating in that the haze and sludge promote the deterioration. Also the sludge may fire on exposure to or heating in air, and such difficulties have been experienced in bulk storage tanks and in shipping containers.

Further, haze and sludge accompanying the antiknock composition are known to deteriorate gasoline, decreasing its induction period, and may also cause or contribute to the fouling of fuel lines, filters, and fuel induction systems. Concurrent with the formation of haze and sludge from the antiknock composition under the conditions described above is the deterioration of the equipment itself, as such conditions are also conducive to the corrosion of metals. The corrosion is further aggravated by the decomposition of the antiknock blend which, by increasing the acidity of the system in the form of halogen acids, accelerates the processes of corrosion. Rusting of a steel tank car, for example, shortens its life and increases the cost of maintaining it in service. Further, the presence of rust scale, together with the insoluble matter of decomposition from the antiknock composition, is troublesome when unloading, since such matter tends to clog delivery lines and filters. As a result, frequent costly and time-consuming cleanings of the equipment are required. Because of the great cost, it is impractical commercially to employ non-corrosive materials of construction or to provide means for excluding water and oxygen from the system and for maintaining the system free of such impurities. Heretofore, various expedients have been suggested for separately controlling either the decomposition of the antiknock composition or the corrosion of the containing vessels. None however have solved the joint problem, as evidenced by the fact that the problem still exists.

Tetraethyllead compositions have been rendered haze-free by treating them with an aqueous solution of an alpha-hydroxy aliphatic carboxylic acid, such as citric acid. However, such treatment, while effective to remove sludge and produce haze-free tetraethyllead antiknock blends, does not protect against corrosion and does not inhibit the blend against the formation of the hazardous ignitible sludge normally encountered on prolonged storage.

Also, it has been proposed to employ corrosion inhibitors that are soluble in the antiknock blends, for example, corrosion inhibitors of the class of aliphatic amine salts of alkyl acid phosphates. These, however, have proved unsatisfactory, particularly as they do not protect against corrosion of wall areas above the liquid level, such "vapor space" corrosion being especially severe in the storage of tetraalkyllead antiknock blends.

It is an object of this invention to provide a novel process for improving the properties and quality of tetraalkyllead antiknock compositions. Another object is to provide a process for purifying tetraalkylated antiknock compositions and particularly for removing suspended sludge and haze-forming impurities therefrom. A further object is to provide such a process which improves the stability of such compositions, lessens the corrosiveness thereof towards ferrous metals, and inhibits the formation of hazardous sludges by such compositions. Other objects are to provide tetraalkyllead compositions of improved properties and to advance the art. Still other objects will appear hereinafter.

The above and other objects may be accomplished in accord with this invention which comprises washing tetraalkyllead antiknock compositions with aqueous ammonia, which compositions consists of tetraalkyllead antiknock compounds and tetraalkyllead antiknock blends which contain small proportions of impurities which tend to form haze, sludge and corrosive products. More particularly, the process comprises intimately mixing with said antiknock composition aqueous ammonia or ammonia and water, employing from about 0.5 to about 100 parts by weight of aqueous phase for each 100 parts by weight of said antiknock composition and an amount of ammonia sufficient to provide at least 0.1% by weight of ammonia based on said antiknock composition, continuing said mixing until said antiknock composition is clear and free of haze, then settling the mixture to form an upper aqueous layer and a lower layer of antiknock composition containing a minor proportion of dispersed aqueous ammonia, and separating said layer of antiknock composition from said aqueous layer.

It has been found that, when tetraalkyllead antiknock compounds and antiknock blends thereof are washed with aqueous ammonia, the aqueous ammonia removes from the tetraalkyllead antiknock compositions suspended sludge and haze-forming impurities and impurities which tend to form insoluble sludge and haze-forming products. The resulting tetraalkyllead composition is usually substantially clear and free of sludge and haze, and is suitable for use as an antiknock agent and other uses without further treatment. Any solid material that occasionally may remain suspended in the composition is in an improved form such that it can readily be removed by filtering the tetraalkyllead composition through a fine (tight) filter. Also, the washed tetraalkyllead compositions have greatly lessened tendencies to deteriorate in storage with the formation of sludge, haze, and corrosive products and any sludge which subsequently may be formed therein is not pyrophoric. Also, the washed tetraalkyllead compositions contain small amounts of dissolved and dispersed aqueous ammonia which further stabilizes such compositions against the formation of sludge, haze, and corrosive products and inhibits the corrosion of ferrous metal vessels in which the tetraalkyllead compositions may be stored or shipped.

Thus, the process of this invention not only provides a clear, haze-free product for commercial use, as a gasoline additive for example, but also provides a large measure of protection both to the tetraalkyllead compositions and to their containers against deterioration during handling, storing, and shipping before final use. Remarkably, the sludge that does form under such conditions is inert on exposure to air and toward heating and thus the hazards accompanying normal occurrence of sludge in stored antiknock compositions are alleviated.

The aqueous layer which is obtained in the process is also substantially free of precipitated sludge or solid material and there is little or no collection of solids at the interface of the layers. When the water is evaporated from such aqueous layer, a pyrophoric sludge or residue is obtained. Thus the aqueous ammonia solutions are remarkably effective to remove and dissolve the sludge, haze, and haze-forming substances normally present in the tetraalkyllead compositions and provide a simple solution to a difficult purification problem on a commercial scale. It has been found that ammonia is uniquely effective for the purposes of this invention and particularly so in view of the small quantities that are required. It does not remove from the antiknock composition any significant amount of any of the essential components of the composition. Also, the ammonia has no deleterious effect on the antiknock compositions or on the performance of the fuels in which they are employed. It is volatile and leaves no deposits during combustion processes.

The tetraalkyllead antiknock compositions, which may be treated in accord with this invention, include tetraethyllead, tetramethyllead, methyltriethyllead, dimethyldiethyllead, trimethylethyllead, mixtures of two or more of such tetraalkyllead antiknock compounds, and antiknock blends containing any one or more of such tetraalkyllead antiknock compounds. Preferably, and most commonly, this invention will be applied to tetraethyllead, or mixtures of tetraethyllead with tetramethyllead, and most particularly with antiknock blends thereof.

The tetraalkyllead compositions may be tetraalkyllead that has been recovered from an alkylation reaction mass by steam distillation or solvent extraction, with or without subsequent aeration to decrease its content of potential sludge-forming impurities. Also, concentrated solutions of tetraalkylleads in liquid hydrocarbons, e.g. solutions of about 80% by weight of tetramethyllead in toluene, may be treated by the process of this invention. Preferably, the invention will be applied to tetraalkyllead compositions which comprise (1) tetraalkyllead antiknock compounds that have been steam distilled and subjected to oxidizing conditions, as by aeration, and (2) tetraalkyllead antiknock blends. Some tetraalkyllead antiknock compounds are used for purposes other than as antiknock agents and some may be sold to oil refiners who desire to compound their own antiknock blends. In such cases and also when the tetraalkyllead antiknock compounds contain unusually large amounts of impurities, it is usually desirable to treat the tetraalkyllead compound itself by the process of this invention; this may be before, during, or after subjecting it to oxidizing conditions. Most of the tetraalkyllead antiknock compounds are marketed and used as antiknock blends which are blends of the tetraalkyllead antiknock compounds with up to 40% by weight of halohydrocarbon scavenging agents, small amounts of characteristic dyes to identify the particular blend, and a minor proportion of a blending agent which conventionally is an inert solvent oil, usually kerosene. Even if the tetraalkyllead antiknock compound has been purified previously by the process of this invention or by other methods, a haze is formed when the tetraalkyllead compound is used to prepare such antiknock blends. Therefore, in order to provide antiknock blends of the highest quality, it is preferred to treat such antiknock blends by the process of this invention regardless of the prior history of the tetraalkyllead compound employed therein.

The halohydrocarbon scavenging agents, as a class, are well known and a great many have been disclosed in the prior art. Conventionally, they are blended with the tetraalkyllead antiknock compound in a proportion sufficient to provide at least two atoms of halogen for each atom of lead present in the tetraalkyllead compound. In the commercial tetraethyllead antiknock blends, either or both of ethylene dichloride and ethylene dibromide are most commonly used as the scavenging agents. The tetraethyllead antiknock blends most commonly in use are of two general types—"Aviation Mix" for use in fuel for aircraft and "Motor Mix" for use in fuel for automobiles. Normally, "Aviation Mix" contains ethylene dibromide as the sole lead scavenging agent in an amount to furnish at least two bromine atoms for each atom of lead. At present, "Motor Mix" usually contains both ethylene dichloride and ethylene dibromide in proportions to furnish about two atoms of chlorine and about one atom of bromine, respectively, for each atom of lead. Blends, containing different proportions of these ethylene dihalides and containing various proportions of other halohydrocarbon scavening agents, are also available on the market. Such various types of tetraalkyllead antiknock blends may be treated by the process of this invention, during or after the blending operation.

The tetraalkyllead compositions that have been treated with ammonia according to the process of this invention may also contain other additives to aid in obviating deterioration under storage conditions. N,N'-dialkyl-p-phenylene diamines, e.g. N,N'-disecondary butyl-p-phenylenediamine, and alkyl phenols, e.g. 2,6-ditertiary butyl-4-methylphenol, in small amounts (0.01–0.1%), are particularly effective against oxidative deterioration. The antioxidants however are not nearly as effective alone, i.e. in the absence of the ammonia treatment, to reduce corrosion of the container and degradation of the antiknock blend, and do not prevent the formation of pyrophoric sludge.

The washing process is simple and easy to operate. A preformed aqueous solution of ammonia i.e. ammonium hydroxide, may be intimately mixed with the tetraalkyllead composition, that is, so as to obtain intimate contact between them. Alternatively, water and ammonia gas can be admixed in the presence of the tetraalkyllead composition, or the tetraalkyllead composition can be blown with ammonia gas in the presence of water, e.g. while intimately mixing water with tetraalkyllead composition. After intimate mixture has been obtained, the mixture is allowed to settle, whereby it forms two layers, an upper aqueous layer, and a lower layer of the antiknock composition containing a minor proportion of dissolved and dispersed aqueous ammonia. Then the layers are separated by conventional means, such as by drawing off the lower layer of tetraalkyllead antiknock composition or decanting off the aqueous layer.

Intimate contact may be achieved by good mixing, as by agitating. The tetraalkyllead antiknock compositions have a density considerably greater than that of the aqueous ammonia treating solution. Therefore, there may be used to advantage the types of mixing which are known to the art for mixing materials of considerably different densities, such as turbulent flow, passing the materials through the center of a centrifugal pump, circulating the materials externally between the bottom and top of a mixing tank, and the like.

The mixing should be continued until the antiknock composition is clear and free of haze. This is readily determined by settling the mixture or a withdrawn sample thereof to form two layers. The duration of the mixing is dependent primarily upon the efficiency of the mixing procedure employed, i.e. the time required to bring the aqueous ammonia solution into intimate contact with all of the antiknock composition. When the process is operated as a batch process with good mechanical agitation, the mixing usually will be conducted for from about 15 minutes to about 60 minutes, particularly in a commercial scale operation. With more efficient types of mixing, particularly in a continuous operation, somewhat shorter mixing times will be satisfactory.

The quantities of ammonia and of water may be varied widely and will depend largely on the quality of the tetraalkyllead antiknock composition that is to be purified and, in the case of the antiknock blends, on the presence or absence of trace impurities in the other blending ingredients. The quantity of the aqueous ammonia solution employed should be sufficient to provide a separate aqueous phase and, for convenient handling of the two-phase system, will normally correspond to from about 0.5 part to about 20 parts by weight for each 100 parts of the tetraalkyllead antiknock composition, preferably from about 2 parts to about 20 parts by weight of the aqueous ammonia for each 100 parts by weight of the antiknock composition. Larger quantities of the aqueous ammonia may be used, up to about 100 parts by weight for each 100 parts of the tetraalkyllead antiknock composition, but obviously the greater the volume of the aqueous solution employed the lesser the remaining capacity of the treating vessel for the antiknock composition. Materially more than 100 parts of aqueous ammonia solution usually are uneconomical.

When ammonia water is used, concentrations of ammonia in water of from about 2% to about 30% by weight are useful for the purposes of this invention. Preferably, the aqueous ammonia solution will contain about 5% or more and most preferably from about 10% to about 15% by weight of ammonia to minimize loss of the highly volatile ammonia to the atmosphere. The amount of the aqueous ammonia solution is dependent somewhat upon the concentration of ammonia therein, as the amount of aqueous solution employed should sufficient to provide at least 0.1% by weight of ammonia based on the tetraalkyllead compound.

When ammonia gas is used, the quantities will be sufficient to provide the above proportions of at least about 2%, preferably about 5% to about 15%, by weight of ammonia based on the water. Excess ammonia can be used, i.e. exceeding its solubility (30%) in water, if desired.

The tetraalkyllead antiknock composition, separated from the aqueous layer, contains a small amount, up to about 0.2% by weight, of ammonia in the form of dissolved and dispersed aqueous ammonia, the amount of ammonia depending upon the concentration of the ammonia in the aqueous treating solution. Such dissolved and dispersed ammonia is not harmful and usually will be left in the antiknock composition where it acts to further stabilize the composition against deterioration and the formation of sludge, haze, and corrosive products and protects the ferrous metal containers of the antiknock composition from corrosion. It has been found that so long as the ammonia-washed product contains aqueous ammonia, the sludge that subsequently may be formed in its presence is inactive. A practical test for detecting ammonia in the washed product is to test for the presence of this base with litmus paper; for example, by passing air through the composition and contacting the resulting vapors with moistened litmus paper. As little as 0.001% ammonia by weight of the antiknock composition has been detected in this way. Usually, it will be desirable to retain or to incorporate in the washed tetraalkyllead antiknock composition from about 0.03% to about 0.2% by weight of ammonia based on the weight of the antiknock composition. As little as 0.001% to 0.005% by weight of ammonia is often beneficial in this respect, being effective for stabilizing the tetraalkyllead antiknock composition for short periods of time, usually somewhat less than a month.

Ordinarily, the process will be carried out at the prevailing atmospheric temperature. Satisfactory results have been obtained at temperatures of from about 0° C. to about 50° C.

Since tetraethyllead and its antiknock blends are the most common tetraalkyllead antiknock compositions employed at the present time and are representative of the antiknock compositions that may be treated by the process of this invention, the present invention will be exemplified hereinafter as applied to representative tetraethyllead antiknock blends. The tetraethyllead, employed for the preparation of the antiknock blends treated in the examples given hereinafter, unless otherwise noted, had been previously processed as follows:

The steam-distilled tetraethyllead from the ethylation reaction was aerated in the presence of about an equal volume of water, by passing air through the charge under vigorous agitation, until the formation of sludge was substantially complete, i.e. until a test sample of the aerated material formed less than about 0.002 gram of sludge per 100 ml. of tetraethyllead on further aeration, and then separating the tetraethyllead from the aqueous phase and from the sludge.

In these tests, as is general for tetraalkyllead compounds made from commercial lead, the quantity of sludge produced on aeration amounts to less than 0.2% by weight of the tetraalkyllead, and most usually is less than 0.1%. Aeration procedures and sludge indexes of tetraalkyllead compounds are described in U.S. Patents 2,400,383 and 2,432,321. It should be understood that this sludge, that can rapidly be precipitated on aeration, is derived from the bulk of the organic bismuth impurities and degradation of some organic lead compounds. As shown in the examples, even tetraethyllead that has been aerated continues to form or eventually forms active sludge in storage. It is not known with certainty whether this formation of active sludge is dependent on the presence of remaining traces of bismuth compounds (or of other impurities) or whether it is inherent in the tetraethyllead itself under the conditions of storage.

Clarity, i.e. freedom from haze, of all the tetraethyllead compositions where given is expressed in terms of their ability to transmit light. Test samples were compared in a Cenco-Sheard Photelometer against haze-free controls (prepared by filtering test samples through Whatman No. 5 fluted filter paper). The percent light transmission of each test sample was obtained on multiplying by 100 the ratio of the observed light transmission values (sample to control). Tetraethyllead antiknock compositions, showing at least 90% light transmission, were visually clear and considered to be acceptably free of haze.

In order to more clearly illustrate this invention, preferred modes of practicing it, and the advantageous results to be obtained thereby, the following examples are given, in which the proportions employed were by weight and the temperatures atmospheric, except where specifically indicated otherwise:

EXAMPLE 1

A haze-free aviation type antiknock blend was prepared as follows: 61.4 parts of steam-distilled and aerated tetraethyllead, 35.7 parts of ethylene dibromide, 0.03 part of a standard blue dye, and 2.88 parts of kerosene were added to and mixed with 1.9 parts of a 12% by weight solution of ammonia in water. After being agitated, for intimate mixing for 30 minutes, the mixture was allowed to separate and the lower blend layer was drawn off. The percent light transmission of this clear blend was 97. In contrast, when the ammonium hydroxide is omitted in the above experiment, the blend shows a percent light transmission of 60–80.

The aqueous ammonia solution, recovered in the above process, may be reused to treat additional antiknock blends in the same way. During such treatment, some of the ammonia is lost to the atmosphere and some to the blend itself. The residual aqueous solution may be fortified, if desired and if necessary, by the further addition of ammonia which may be either as ammonia gas or as concentrated aqueous ammonia. For example, to the residual aqueous solution of the above Example there was added 0.30 part of 29% by weight ammonium hydroxide and the mixing procedure repeated to prepare another batch of the sludge-free and haze-free antiknock blend.

EXAMPLE 2

An aviation type antiknock blend was prepared by mixing 61.4 parts by weight of steam-distilled and aerated tetraethyllead, 35.7 parts by weight of ethylene dibromide, 0.03 part by weight of a standard blue dye, and 2.88 parts by weight of kerosene. The blend was hazy and showed only 78% light transmission.

A. 100 volumes (174 parts by weight) of the above blend was washed with 20 volumes (18 parts by weight) of concentrated (29%) ammonium hydroxide, by mechanically agitating the two-phase system for 15 minutes at room temperature. The phases were allowed to separate and the now clear blend layer removed. The thus washed blend layer showed a percent light transmission of 98 and contained 0.05% ammonia by weight.

B. The above haze-free ammonia-washed blend was subjected to the following storage test to determine its corrosiveness and sludging tendencies relative to a blend of the same composition that had been made haze-free (98% light transmission) by washing with 10% by weight of a 0.5% citric acid solution, such citric acid treatment representing the best commercial method heretofore known for removing sludge and haze-forming impurities from tetraethyllead compositions.

10 gallon portions of the haze-free ammonia-washed blend were placed in 15-gallon steel drums, and a ⅛ x 1 x 2" 1020 mild steel coupon was hung in the vapor space of each drum. The drums were sealed and stored for 5 months outdoors, during which time the temperature varied from about 10° C. to 30° C. Stored, along with the above under the same conditions, were control drums containing citric-acid washed blend along with 0.05% by volume (about 0.026% by weight) of either water or concentrated (29% by weight) ammonium hydroxide. The test coupons were checked periodically for corrosion.

At the end of 3 months storage, the vapor space coupon of the control showed definite signs of objectional corrosion, while the coupons of both the ammonia-washed and the ammonia-containing blends showed almost no visible corrosion. After the fifth month, the test coupons (each of known weight and dimensions) were weighed and measured and the over-all corrosion attack calculated as inches of penetration per month. The coupons were also examined under the microscope for evidence of pitting, cratering, etching, etc. The results of these tests are summarized below in Table I.

The aged blends were sampled for sludge, which had accumulated during the 5 months of storage, and the ignition activity of the sludge was tested as follows: Each blend was mixed in its drum by rolling for 15 minutes. Then, a 2-liter sample was taken from near the bottom by siphoning, and filtered through fluted filter paper which was next spread open on a watch glass and heated on a steam bath. Active sludges usually ignite within two hours, some smoking and charring before bursting into flame, others taking fire suddenly. Inert sludges can be heated for at least eight hours after drying out without change. Results of the sludge test are also summarized in Table I below.

Table I
CORROSION AND SLUDGE TEST DATA

| Composition | Corrosion (5 Months) | | Sludge | |
|---|---|---|---|---|
| | Rate, In./Mo. | Condition of Coupon | Amount, Grams/ 100 Ml. | Activity |
| Blend+0.05% water | 0.00041 | rusting, etching and pitting. | 0.045 | Ignited. |
| Blend+0.05% Conc. NH₄OH. | 0.00027 | Moderate etch and cratering. | 0.006 | (¹) |
| Blend, ammonia-washed | 0.00002 | light etch. | 0.001 | No decomposition. |

¹ Not tested in this series, but subsequent tests on sludge formed from blend treated in this way showed it to be ignitible.

Thus, simply storing the blend in the presence of ammonia is sufficient to retard corrosion significantly, but washing of the blend with ammonia prior to storage is particularly effective to inhibit corrosion and also to obviate formation of potentially hazardous sludge.

EXAMPLE 3

This experiment shows further the effectiveness of ammonia-washing of tetraethyllead antiknock compositions to eliminate the potential hazard of ignitible explosive sludge.

Steam-distilled, but unaerated, tetraethyllead was blended with ethylene dibromide, blue identifying dye and kerosene in the proportions given in Example 1. In duplicate experiments, 250 parts by volume of the blend was vigorously stirred with 100 parts by volume of either water or concentrated ammonium hydroxide for 30 minutes. The mixture was allowed to settle, and the blend layer (containing 0.1% by weight of ammonia) removed and then aerated by blowing with air in the presence of an equal volume of water to precipitate sludge. A portion of unwashed blend was aerated in the same way and its sludge collected for comparison. Ignition activity of the sludge was determined as in Example 2. The results follow:

| Treatment of Blend | Activity of Sludge |
|---|---|
| No wash | Ignited within 2 hours. |
| Water wash | Do. |
| Ammonia wash | No decomposition during 8 hours. |

EXAMPLE 4

One liter of a blend, made up of approximately 373 g. ethylene dibromide, 1285 g. steam distilled but unaerated tetraethyllead, and 37.7 g. kerosene, was vigorously shaken with 40 ml. of 2% aqueous NH₃ for about 30 minutes, and then the mixture was allowed to settle. The blend layer was removed and then blown with a steady stream of air (through a gas sparging tube) for one hour. During this time, the gas exiting from the blend was basic to moistened litmus paper, and the sludge which precipitated was inactive (by filtration and testing as previously described). Aeration was resumed until NH₃ could no longer be detected by the litmus paper test, and then continued further to precipitate more sludge. This sludge was active.

EXAMPLE 5

One liter of a blend of the composition given in Example 4 was washed with 40 ml. of 6% aqueous NH₃ until the blend layer, by analyses, contained 0.025% NH₃. One part of this ammonia-containing blend was mixed with 4 parts of filtered but unwashed blend to lower the ammonia content to 0.004%. One liter of the mixture was vigorously agitated under an air atmosphere in a closed 3 liter flask for 16 hours. The NH₃ content of the blend was found to be 0.001%, and the sludge that formed during the 16 hours was inactive.

EXAMPLE 6

Ten ml. of water was added to 100 ml. of crude, steam distilled, but unaerated, tetraethyllead. The mixture was then blown with separate streams of NH₃ gas and air. The NH₃ was started first, 30 seconds later the air while continuing the NH₃. The flow of both gases (each in large excess) was sufficient to effect mixing of the two liquid layers and was maintained for 1 hour. A substantial amount of the sludge that formed was taken into the aqueous phase (saturated with ammonia). Some of the sludge remained undissolved. This sludge was inactive. Control runs, omitting either the water or the NH₃, produced active sludge.

Identical results were obtained with "Orange Motor Mix" and "Blue Aviation Mix" formulations made of steam distilled but unaerated tetraethyllead. "Orange Motor Mix" was a blend of 61.40% tetraethyllead, 17.86% ethylene dibromide, 18.81% ethylene dichloride, 0.05% orange dye, and 1.88% kerosene. The "Blue Aviation Mix" had the same composition as the blend of Example 1.

It will be understood that the preceding examples have been given for illustrative purposes solely and that this invention is not limited to the specific embodiments described therein. On the other hand, it will be readily apparent to those skilled in the art that the tetraalkyllead compounds, the tetraalkyllead antiknock blends, the proportions of ammonia, and the techniques and conditions employed may be widely varied within the limits set forth in the general description without departing from the spirit or scope of this invention.

From the preceding description, it will be apparent that this invention provides a novel process for materially improving the properties and quality of tetraalkyllead antiknock compositions and particularly for removing sludge, haze, sludge-forming and haze-forming impurities, including particularly impurities tending to form pyrophoric sludge, and to produce tetraalkyllead compositions of materially improved purity and stability. Such process is simple, easy and economical to operate and effectively solves a long-standing troublesome problem. Accordingly, it will be apparent that this invention constitutes a valuable advance in and contribution to the art.

The embodiments of the invention in which an exclusive property or privilege is claimed are defined as follows:

1. The process for purifying an antiknock composition of the group consisting of at least one tetraalkyllead antiknock compound and a tetraalkyllead antiknock blend, which antiknock composition contains a small proportion of impurities which tend to form haze, sludge and corrosive products, which process comprises intimately mixing with said antiknock composition from about 0.5 to about 100 parts by weight of aqueous ammonia for each 100 parts by weight of said antiknock composition, said aqueous ammonia containing an amount of ammonia sufficient to provide at least 0.1% by weight of ammonia based on said antiknock composition, continuing said mixing until said antiknock composition is clear and free of haze, then settling the mixture to form an upper aqueous layer and a lower layer of antiknock composition containing a minor proportion of dispersed aqueous ammonia, and separating said layer of antiknock composition from said aqueous layer.

2. The process for purifying an antiknock composition of the group consisting of at least one tetraalkyllead antiknock compound and a tetraalkyllead antiknock blend, which antiknock composition contains a small proportion of impurities which tend to form haze, sludge and corrosive products, which process comprises intimately mixing with said antiknock composition, aqueous ammonia containing from about 2% to about 30% by weight of ammonia, employing from about 0.5 to about 100 parts by weight of said aqueous ammonia for each 100 parts by weight of said antiknock composition sufficient to provide at least 0.1% by weight of ammonia based on said antiknock composition, continuing said mixing until said antiknock composition is clear and free of haze, then settling the mixture to form an upper aqueous layer and a lower layer of antiknock composition containing a minor proportion of dispersed aqueous ammonia, and separating said layer of antiknock composition from said aqueous layer.

3. The process for purifying an antiknock composition of the group consisting of at least one tetraalkyllead antiknock compound and a tetraalkyllead antiknock blend, which antiknock composition contains a small proportion of impurities which tend to form haze, sludge and corrosive products, which process comprises intimately mixing with said antiknock composition, aqueous ammonia containing from about 5% to about 15% by weight of ammonia, employing from about 0.5 to about 100 parts by weight of said aqueous ammonia for each 100 parts by weight of said antiknock composition sufficient to provide at least 0.1% by weight of ammonia based on said antiknock composition, continuing said mixing for from about 15 minutes to about 60 minutes, then settling the mixture to form an upper aqueous layer and a lower layer of antiknock composition containing from about 0.03% to about 0.2% by weight of ammonia, and separating said layer of antiknock composition from said aqueous layer.

4. The process for purifying a tetraethyllead antiknock blend which contains a small proportion of impurities which tend to form haze, sludge and corrosive products, which process comprises intimately mixing with said antiknock blend aqueous ammonia containing from about 2% to about 30% by weight of ammonia, employing from about 0.5 to about 100 parts by weight of said aqueous ammonia for each 100 parts by weight of said antiknock blend sufficient to provide at least 0.1% by weight of ammonia based on said antiknock blend, continuing said mixing for from about 15 minutes to about 60 minutes, then settling the mixture to form an upper aqueous layer and a lower layer of antiknock blend containing a minor proportion of dispersed aqueous ammonia, and separating said layer of antiknock blend from said aqueous layer.

5. The process for purifying a tetraethyllead antiknock blend which contains a small proportion of impurities which tend to form haze, sludge and corrosive products, which process comprises intimately mixing with said antiknock blend aqueous ammonia containing from about 10% to about 15% by weight of ammonium hydroxide, employing from about 2 to about 20 parts by weight of said aqueous ammonia for each 100 parts by weight of said antiknock blend, continuing said mixing for from about 15 minutes to about 60 minutes, then settling the mixture to form an upper aqueous layer and a lower layer of antiknock blend containing from about 0.03% to about 0.2% by weight of ammonia, and separating said layer of antiknock blend from said aqueous layer.

6. The process for purifying tetraethyllead which contains a small proportion of impurities which tend to form haze, sludge and corrosive products, which process comprises intimately mixing with said tetraethyllead aqueous ammonia containing from about 5% to about 30% by weight of ammonium hydroxide, employing from about 1 to about 100 parts by weight of said aqueous ammonia for each 100 parts by weight of said tetraethyllead sufficient to provide at least 0.1% by weight of ammonia based on said tetraethyllead, continuing said mixing until said tetraethyllead is clear and free of haze, then settling the mixture to form an upper aqueous layer and a lower layer of tetraethyllead containing a minor proportion of dispersed aqueous ammonia, and separating said layer of tetraethyllead from said aqueous layer.

7. The process for purifying tetraethyllead which contains a small proportion of impurities which tend to form haze, sludge and corrosive products, which process comprises intimately mixing with said tetraethyllead aqueous ammonia containing from about 10% to about 15% by weight of ammonium hydroxide, employing from about 2 to about 20 parts by weight of said aqueous ammonia for each 100 parts by weight of said tetraethyllead, continuing said mixing for from about 15 minutes to about 60 minutes, then settling the mixture to form an upper aqueous layer and a lower layer of tetraethyllead containing from about 0.03% to about 0.2% by weight of ammonia, and separating said layer of tetraethyllead from said aqueous layer.

References Cited in the file of this patent

UNITED STATES PATENTS

| | | |
|---|---|---|
| 1,975,171 | Parmelee | Oct. 2, 1934 |
| 2,407,261 | Downing et al. | Sept. 10, 1946 |
| 2,407,262 | Linch | Sept. 10, 1946 |
| 2,407,263 | Linch | Sept. 10, 1946 |
| 2,407,307 | Linch | Sept. 10, 1946 |
| 2,410,356 | Parmelee | Oct. 29, 1946 |
| 2,432,321 | Linch | Dec. 9, 1947 |
| 2,621,200 | Kolka et al. | Dec. 9, 1952 |